3,298,820
HERBICIDAL CONCENTRATE CONTAINING MONOSODIUM ACID METHANEARSONATE
Stanley M. Woogerd, Corte Madera, Calif., assignor to Hercules Glue Company, Ltd., a corporation of California
No Drawing. Filed Apr. 20, 1964, Ser. No. 361,290
2 Claims. (Cl. 71—2.7)

This invention relates to a herbicide and more particularly relates to a novel herbicide formulation containing monosodium acid methanearsonate in a concentrated solution together with a surfactant.

Monsodium acid methanearsonate has been recognized as a highly effective selective herbicide for use on grasses or grassy weeds and is particularly valuable as a herbicide for use on cotton and also in non-crop applications such as the controlling of certain grasses and weeds on ditch banks, right-of-ways, storage yards and the like.

It has been found that monsodium acid methanearsonate is much more effective if it is used in conjunction with a surfactant. Thus, although the monosodium acid methanearsonate is an effective herbicide by itself, it can be used in smaller quantities if it is used in connection with a surfactant.

The surfactants heretofore employed for this purpose have not been soluble in monsodium acid methanearsonate solutions, so it has been necessary to mix the surfactant and the solution of monosodium acid methanearsonate in a spray tank with agitation just before application. Since this involves the handling and measuring of two different chemicals and the necessity of continuous agitation, the employment of a separate surfactant is inconvenient and it would be highly desirable to have a single solution which contains both the active herbicide and the surfactant.

In accordance with the present invention, it has been found that a chemical available under the trademark Benax 2AO is an effective surfactant for, and is compatible with, solutions of monosodium acid methanearsonate, so that for the first time it is possible to provide a single solution which contains a large amount of monosodium acid methanearsonate together with a surfactant. Benax 2AO is a 40% aqueous solution of an 85%–15% mixture of odecyldiphenyl ether disulfonic acid and didodecyldiphenyl ether disulfonic acid, respectively. Although Benax 2AO by itself forms an effective surfactant, the effectiveness can be even further improved by the incorporation of other materials with it. Thus, triethanol amine or other water soluble amines can be added to the Benax 2AO since the latter is an acidic material; it is desirable to add sufficient amine to adjust the pH to about 6.4, the approximate acidity of the monosodium acid methanearsonate solution. Instead of triethanol amine, other water soluble amines such as isopropyl amine and butyl amine can be used; suitable amines have a chain length no longer than four carbon atoms.

Further, an additional wetting agent such as a material available under the trademark Tergitol Anionic 08 helps solubilize the mixture and is in the formulation. Tergitol Anionic 08 is a 40% solution in water of ethyl hexyl sulfate. In addition, a small amount of ethylene glycol can be added to the solution to act as a humectant to prevent the solution from drying out after it is on the plant surface, since it is more effective if it remains in fluid form for a substantial period of time.

Thus, although the Benax 2AO can be used as the sole surfactant, it is preferred to combine it with Tergitol Anionic 08, triethanol amine and ethylene glycol. The amount of Benax 2AO can vary from about 40–100%, the amount of triethanol amine can vary from about 0 to 35%, the amount of Tergitol Anionic 08 can vary from about 0 to 40%, and the amount of ethylene glycol can vary from 0 to 5%. It is preferred to employ a surfactant containing about 58.2% by weight Benax 2AO, 17.8% triethanol amine, 21% Tergitol Anionic 08 and 3% ethylene glycol. This composition is soluble in a 50% by weight solution of monsodium acid methanearsonate to an extent of 15–80%. Normally, it is preferred to employ a solution containing about equal parts of the surfactant and the monosodium acid methanearsonate. Thus, when the concentrate is diluted for application, the solution will contain optimum amounts of both herbicide and surfactant for effective weed control.

The following non-limiting examples illustrate preferred embodiments of the invention.

*Example 1*

A surfactant solution was prepared containing the following (by weight):

| | Percent |
|---|---|
| Benax 2AO (40% solids) | 58.2 |
| Triethanol amine | 17.8 |
| Tergitol Anionic 08 | 21.0 |
| Ethylene glycol | 3.0 |

This surfactant solution was then added to an aqueous herbicide solution containing about 50% by weight of monosodium acid methanearsonate. The surfactant solution was soluble in the herbicide solution in proportions of from 15% to 80% by volume.

*Example 2*

A composition was made substantially like Example 1 except that the surfactant was composed entirely of a 40% solids aqueous solution of Benax 2AO. Here again the surfactant solution was soluble in the herbicide solution in proportions of about 15% to 80% by volume. Thus, herbicide concentrates could be blended containing from about 10% to 45% of monosodium acid methanearsonate and from about 6% to about 35% of the surfactant.

The herbicidal compositions formulated in accordance with Examples 1 and 2 were clear solutions and were stable to a temperature down to about 29° F. At lower temperatures, a small amount of material crystallized out of the solution, but upon rewarming, the material went back into solution. In use, it was found that the surfactant greatly increased the effectiveness of the monosodium acid methanearsonate.

The compositions of the examples are concentrates which are diluted with water prior to application.

I claim:
1. A herbicide concentrate comprising in combination a solution containing from about 10% to 45% of monosodium acid methanearsonate and from about 6% to about 35% of a surfactant, the balance of the composition being water, wherein the surfactant has as its principal active ingredient an 85% to 15% mixture of dodecyldi- phenyl ether disulfonic acid and didodecyldiphenyl ether disulfonic acid, respectively and wherein the surfactant includes an amount of amine having a maximum chain length of four carbon atoms, sufficient to adjust the pH to about 6.4, and approximately equal amount of ethyl hexyl sulfate, and a small amount of ethylene glycol.

2. A herbicide concentrate comprising a mixture of from 15% to 80% by volume of a herbicide solution with the balance of the solution being a surfactant solution wherein said herbicide solution is an aqueous solution containing about 50% by weight of monosodium acid methanearsonate and wherein said surfactant solution contains about the following percentages by weight:

| | Percent |
|---|---|
| Benax 2AO (40% solids) | 58.2 |
| Triethanol amine | 17.8 |
| Tergitol Anionic 08 | 21.0 |
| Ethylene glycol | 3.0 |

References Cited by the Examiner

UNITED STATES PATENTS

| | | | |
|---|---|---|---|
| 2,081,876 | 5/1937 | Prahl | 260—512 |
| 2,244,512 | 6/1941 | Brandt | 260—512 |
| 2,531,276 | 11/1950 | Klingel | 71—2.7 X |
| 2,594,135 | 4/1952 | Denny | 71—2.7 X |
| 2,637,643 | 5/1953 | Tischler | 71—2.7 X |
| 2,678,265 | 5/1954 | Schwerdle | 71—2.7 |
| 2,709,648 | 5/1955 | Ryker | 71—2.6 X |
| 2,722,478 | 11/1955 | Olin | 71—2.7 |
| 3,056,668 | 10/1962 | Sprague | 71—2.7 X |
| 3,056,821 | 10/1962 | Schwerdle | 71—2.7 X |
| 3,127,441 | 3/1964 | Valenta et al. | 260—512 |

LEWIS GOTTS, *Primary Examiner.*

JAMES O. THOMAS, *Examiner.*

ALBERT J. ADAMCIK, *Assistant Examiner.*